(12) United States Patent
Chen et al.

(10) Patent No.: US 9,103,736 B2
(45) Date of Patent: Aug. 11, 2015

(54) MODELING AN INTERPRETATION OF REAL TIME COMPACTION MODELING DATA FROM MULTI-SECTION MONITORING SYSTEM

(75) Inventors: Jianfeng Chen, Pearland, TX (US); Xudong Yang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 1039 days.

(21) Appl. No.: 12/959,764

(22) Filed: Dec. 3, 2010

(65) Prior Publication Data
US 2012/0143521 A1   Jun. 7, 2012

(51) Int. Cl.
  G01B 5/00    (2006.01)
  E21B 41/00   (2006.01)
  G01L 1/24    (2006.01)

(52) U.S. Cl.
  CPC ..................... *G01L 1/246* (2013.01)

(58) Field of Classification Search
  CPC ...... E21B 47/0006; G01L 1/246; G02B 6/022
  USPC ........................................................ 702/42
  See application file for complete search history.

(56) References Cited

U.S. PATENT DOCUMENTS

| | | |
|---|---|---|
| 4,030,064 A | 6/1977 | Elliott |
| 4,859,844 A | 8/1989 | Herman et al. |
| 5,050,089 A | 9/1991 | Stelson et al. |
| 5,401,956 A | 3/1995 | Dunphy et al. |
| 5,440,310 A | 8/1995 | Schreiner |
| 5,481,922 A | 1/1996 | Washabaugh |
| 5,625,724 A | 4/1997 | Frederick et al. |
| 5,675,674 A | 10/1997 | Weis |
| 5,869,835 A | 2/1999 | Udd |
| 5,892,860 A | 4/1999 | Maron et al. |
| 5,963,321 A | 10/1999 | Wang |
| 6,016,702 A | 1/2000 | Maron |
| 6,069,686 A | 5/2000 | Wang et al. |

(Continued)

FOREIGN PATENT DOCUMENTS

| | | |
|---|---|---|
| DE | 19913113 A1 | 10/2000 |
| EP | 0892244 A2 | 1/1999 |

(Continued)

OTHER PUBLICATIONS

International Search Report and Written Opinion dated Jun. 28, 2012 for International Application No. PCT/US2011/059130.

(Continued)

*Primary Examiner* — Janet Suglo
*Assistant Examiner* — Michael Dalbo
(74) *Attorney, Agent, or Firm* — Cantor Colburn LLP

(57) ABSTRACT

A method, apparatus and computer-readable medium for determining deformation of a plurality of coupled members. A distributed strain sensor string on a first member is coupled to a distributed strain sensor string on a second member. Signals are obtained from the sensor strings. A subset of strain data relating to sensor strain on the first member and the second member is created. A virtual sensor string is created having a plurality of virtual sensors placed on the first and second members including a joint therebetween. Strain data of sensors in the distributed stain sensor strings is mapped to sensors in the virtual sensor string. The deformation of the plurality of coupled members is determined using the strain data of the virtual sensors.

32 Claims, 8 Drawing Sheets

(56) References Cited

U.S. PATENT DOCUMENTS

| | | | |
|---|---|---|---|
| 6,072,567 A | 6/2000 | Sapack | |
| 6,233,746 B1 | 5/2001 | Skinner | |
| 6,252,656 B1 | 6/2001 | Wu et al. | |
| 6,256,090 B1 | 7/2001 | Chen et al. | |
| 6,285,446 B1 | 9/2001 | Farhadiroushan | |
| 6,314,214 B1* | 11/2001 | Walter et al. | 385/13 |
| 6,346,702 B1 | 2/2002 | Davis et al. | |
| 6,370,406 B1 | 4/2002 | Wach et al. | |
| 6,487,349 B2 | 11/2002 | Wach et al. | |
| 6,501,067 B2 | 12/2002 | Jones et al. | |
| 6,611,633 B1 | 8/2003 | Vohra et al. | |
| 6,640,647 B1 | 11/2003 | Hong et al. | |
| 6,753,791 B2 | 6/2004 | Wei et al. | |
| 7,028,543 B2 | 4/2006 | Hardage et al. | |
| 7,245,791 B2 | 7/2007 | Rambow et al. | |
| 7,327,907 B2 | 2/2008 | Shaibani et al. | |
| 7,424,186 B2 | 9/2008 | Arab-Sadeghabadi et al. | |
| 7,769,252 B2* | 8/2010 | Taverner et al. | 385/12 |
| 7,946,341 B2 | 5/2011 | Hartog et al. | |
| 2001/0021843 A1* | 9/2001 | Bosselmann et al. | 606/2 |
| 2002/0075114 A1 | 6/2002 | Hall et al. | |
| 2003/0217605 A1 | 11/2003 | Croteau et al. | |
| 2003/0219147 A1 | 11/2003 | Nishiura | |
| 2004/0028311 A1 | 2/2004 | Moslehi et al. | |
| 2004/0065439 A1 | 4/2004 | Tubel et al. | |
| 2004/0083808 A1 | 5/2004 | Rambow et al. | |
| 2004/0099420 A1* | 5/2004 | Kotrla et al. | 166/345 |
| 2004/0184700 A1 | 9/2004 | Li et al. | |
| 2005/0149264 A1 | 7/2005 | Tarvin et al. | |
| 2005/0167094 A1* | 8/2005 | Streich et al. | 166/66 |
| 2006/0120675 A1 | 6/2006 | Goldner et al. | |
| 2006/0225881 A1 | 10/2006 | O'Shaughnessy et al. | |
| 2006/0233482 A1 | 10/2006 | Rambow | |
| 2007/0051882 A1* | 3/2007 | Childers | 250/227.14 |
| 2007/0065077 A1 | 3/2007 | Childers et al. | |
| 2007/0126594 A1 | 6/2007 | Atkinson et al. | |
| 2007/0156019 A1 | 7/2007 | Larkin et al. | |
| 2007/0251326 A1 | 11/2007 | Mathis | |
| 2007/0253144 A1 | 11/2007 | Kuwajima | |
| 2007/0289741 A1 | 12/2007 | Rambow | |
| 2008/0047662 A1 | 2/2008 | Dria et al. | |
| 2008/0210725 A1 | 9/2008 | Birtwisle et al. | |
| 2009/0063087 A1* | 3/2009 | Grichnik et al. | 702/127 |
| 2009/0085710 A1 | 4/2009 | Meinke | |
| 2009/0097015 A1 | 4/2009 | Davies et al. | |
| 2009/0254280 A1 | 10/2009 | Stoesz | |
| 2010/0051347 A1 | 3/2010 | Tchakarov et al. | |
| 2010/0219334 A1 | 9/2010 | Legrand et al. | |
| 2010/0303426 A1* | 12/2010 | Davis | 385/95 |
| 2011/0054808 A1 | 3/2011 | Pearce et al. | |
| 2011/0113852 A1* | 5/2011 | Prisco | 73/1.15 |
| 2012/0132417 A1* | 5/2012 | Dria et al. | 166/250.01 |
| 2012/0143522 A1 | 6/2012 | Chen et al. | |
| 2012/0143523 A1 | 6/2012 | Chen et al. | |
| 2012/0143524 A1 | 6/2012 | Chen et al. | |
| 2012/0143525 A1 | 6/2012 | Chen et al. | |

FOREIGN PATENT DOCUMENTS

| | | |
|---|---|---|
| GB | 2368921 A | 5/2002 |
| GB | 2397885 A | 8/2004 |
| GB | 2411956 A | 9/2005 |
| GB | 2433112 A | 6/2007 |
| JP | 3252501 A | 11/1991 |
| JP | 2002107122 A | 4/2002 |
| JP | 2003294851 A | 10/2003 |
| RU | 2205374 C2 | 5/2003 |
| WO | WO0012978 | 3/2000 |
| WO | WO03014657 A1 | 2/2003 |
| WO | WO03050376 A2 | 6/2003 |
| WO | WO2006113327 A1 | 10/2006 |
| WO | WO2006123068 A1 | 11/2006 |

OTHER PUBLICATIONS

International Search Report and Written Opinion dated Jun. 29, 2012 for International Application No. PCT/US2011/059119.

International Search Report and Written Opiinion dated Jun. 29, 2012 for International Application No. PCT/US2011/059124.

International Search Report and Written Opinion dated Jun. 28, 2012 for International Application No. PCT/US2011/059122.

International Search Report and the Written Opinion of the International Searching Authority, or the Declaration for International Application No. PCT/US2011/059116.

Barak, Phillip; "Smoothing and Differentiation by an Adaptive-Degree Polynomial Filter," Analytical Chemistry, vol. 67, No. 17, Sep. 1, 1995, pp. 2758-2762.

Browne, M., et al.; "A multiscale polynomial filter for adaptive smoothing," Digital Signal Processing 17, (2007), pp. 69-75.

Hayes, Monson H.; "Recursive Least Squares, 9.4," Statistical Digital Signal Processing and Modeling, 1996, pp. 541-553.

Savitzky, A. et al.; "Smoothing and Differentiation of Data by Simplified Least Squares Procedures," Analytical Chemistry, vol. 36, No. 8, Jul. 1964, pp. 1627-1639.

Timoshenko, S.; "Analysis of Bi-Metal Thermostats," J.O.S.A. & R.S.I., Sep. 11, 1925, pp. 233-255.

Rambow, F.H.K. et al.; "Real-Time Fiber-Optic Casing Imager," Dec. 2010 SPE Journal, pp. 1095-1103.

* cited by examiner

US 9,103,736 B2

MODELING AN INTERPRETATION OF REAL TIME COMPACTION MODELING DATA FROM MULTI-SECTION MONITORING SYSTEM

CROSS REFERENCE TO RELATED APPLICATIONS

The present application is related to U.S. patent application Ser. No. 12/960,140, filed Dec. 3, 2010, U.S. patent application Ser. No. 12/959,862, filed Dec. 3, 2010, U.S. patent application Ser. No. 12/960,119, filed Dec. 3, 2010, U.S. patent application Ser. No. 12/959,819, filed Dec. 3, 2010, and U.S. patent application Ser. No. 12/959,781, filed Dec. 3, 2010, the contents of which are hereby incorporated herein by reference in their entirety.

BACKGROUND OF THE DISCLOSURE

1. Field of the Disclosure

The present disclosure is related to determining a deformation of a tubular having multiple tubular sections.

2. Description of the Related Art

Tubulars are used in many stages of oil exploration and production, such as drilling operations, well completions and wireline logging operations. These tubulars often encounter a large amount of stress, due to compaction, fault movement or subsidence, for example, which can lead to tubular damage or even to well failure. It is generally desirable to monitor tubular in order to understand the mechanisms of tubular failures. Typical methods for monitoring stress on a tubular uses a plurality of sensors such as optical sensors of a fiber optic cable along the outer surface of the tubular. These methods are typically designed with respect to a single cable. Since a tubular typically consists of multiple sections assembled on-site, the fiber optic cable generally consists of multiple fiber optic cables spliced together. Multiple connected fiber optic cables produce a dataset that is different from a single fiber optic cable which can affect outcomes. The present disclosure corrects differences in datasets between multiple connected fiber optic cables and a single fiber optic cable.

SUMMARY OF THE DISCLOSURE

The present disclosure in one aspect provides a method for determining deformation of a plurality of coupled members, the method including: coupling a distributed strain sensor string on a first member to a distributed strain sensor string on a second member; obtaining signals from the sensor strings; creating subset strain data relating to sensor strain on the first member and the second member; creating a virtual sensor string having a plurality of virtual sensors placed on the first and second members including a joint therebetween; mapping strain data of sensors in the distributed stain sensor strings to sensors in the virtual sensor string; and determining deformation of the plurality of coupled members using the strain data of the virtual sensors.

In another aspect, the present disclosure provides an apparatus for determining deformation for a plurality of coupled members, the apparatus including a first distributed strain sensor string on a first of the plurality of coupled members; a second distributed strain sensor string on a second of the plurality of coupled members and coupled to the first distributed strain sensor string; an interrogation unit configured to obtain signals from the first and second strain sensor strings; and a processor configured to: create subset strain data relating to sensor strain on the first member and the second member, create a virtual sensor string having a plurality of virtual sensors placed on the first and second members including a joint therebetween, map strain data of sensors in the distributed stain sensor strings to sensors in the virtual sensor string, and determine deformation of the plurality of coupled members using the strain data of the virtual sensors.

In another aspect, the present disclosure provides a computer readable medium having stored thereon instructions that when read by a processor enable the processor to perform a method, the method comprising: coupling a distributed strain sensor string on a first member to a distributed strain sensor string on a second member; obtaining signals from the sensor strings; creating subset strain data relating to sensor strain on the first member and the second member; creating a virtual sensor string having a plurality of virtual sensors placed on the first and second members including a joint therebetween; mapping strain data of sensors in the distributed stain sensor strings to sensors in the virtual sensor string; and determining deformation of the plurality of coupled members using the strain data of the virtual sensors.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

Figure 1:
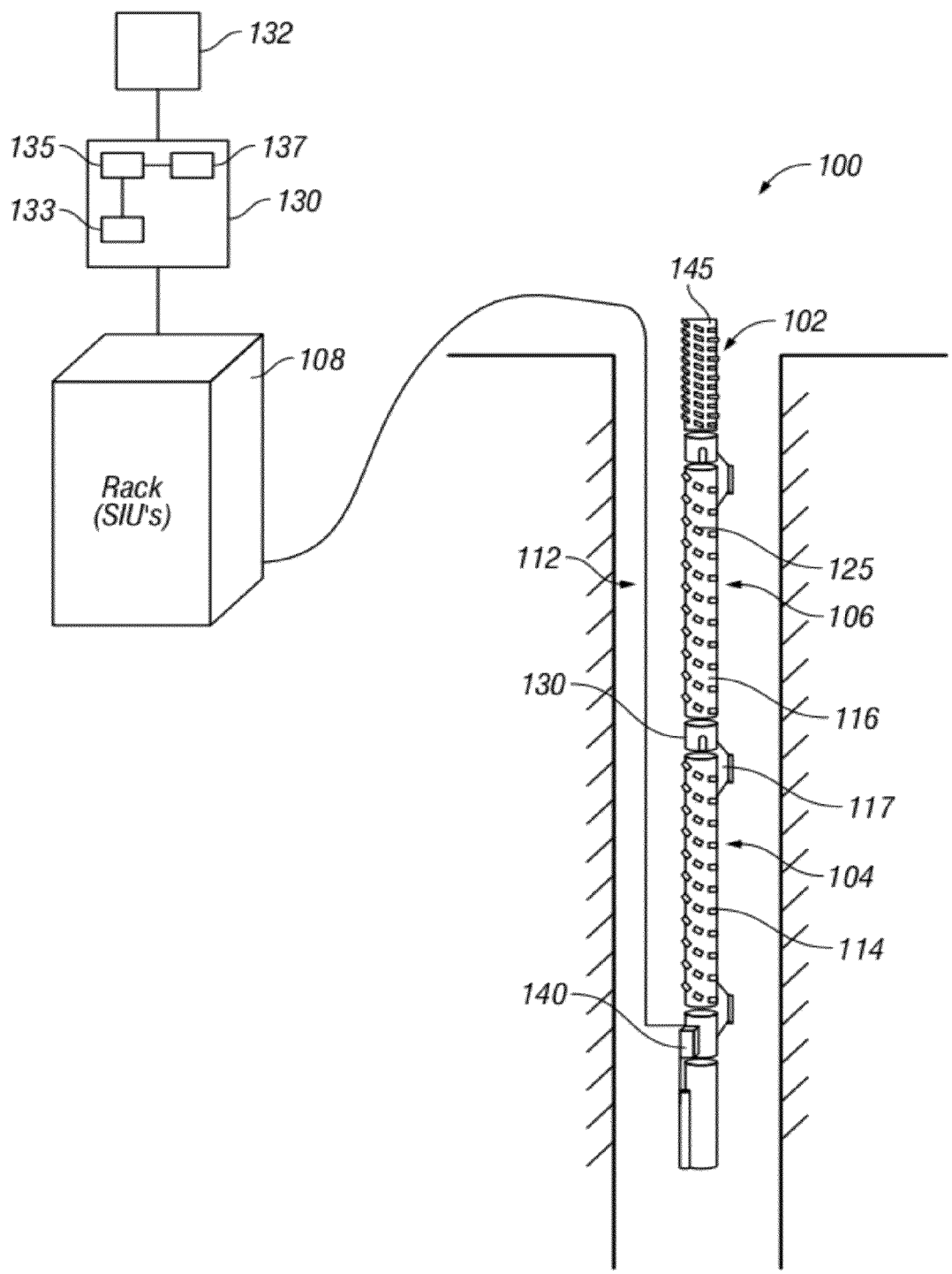
FIG. 1 shows an exemplary embodiment of a system for determining a deformation of a tubular including a multiple tubular sections disposed in a wellbore.

FIG. 1 shows an exemplary embodiment of a system 100 for determining a deformation of a tubular 102 disposed in a wellbore 120. The exemplary tubular 102 includes a first tubular section 104 and a second tubular section 106 adjoined to the first tubular section 104 and substantially sharing a longitudinal axis with the first tubular section 104. Tubular 102 may be any tubular typically used in a wellbore 120, such as a well casing or a drilling tubular, for example. When under an applied force, the tubular generally undergoes a variety of deformations such as a bending deformation and cross-sectional deformations, for example. For the purposes of discussion, FIG. 1 shows a tubular that includes a first and second tubular section. However, the present disclosure is not intended to be limited to a two-section tubular and may be extended to a tubular having any number of tubular sections.

The tubular includes an optical fiber or fiber optic cable 112 wrapped around the tubular 102 to obtain measurements of strain at the tubular. Typically, the fiber optic cable 112 includes a first fiber optic cable 114 wrapped around the first tubular section 104 and a second fiber optic cable 116 wrapped around the first tubular section 106 and connected to each other at a splice 117. First and second tubular sections are connected using a collar 130. First and second fiber optic cables are physically connected using a connector 117 such as a Dry Mate connector. Dry Mate connectors providing fiber connection with minimal signal loss in a downhole environment. A leading end of the first fiber optic cable 114 is coupled to a sensing unit 108 typically at a surface location that in one aspect obtains an optical measurement of wavelength shift from various optical sensors 125 spaced along the cables 114 and 116 that are related to strain, as discussed below. Leading end of cable 114 is at a bottom end of the first tubular section 104 and wraps upward. A trailing end of the first fiber optic cable 114 is connected to a leading end of the second fiber optic cable 116 via connector 117 to form the single fiber optic cable 112. The laser light source is transmitted into a fiber splicer, such as an H-splice 140, which is located on the bottom section. On the top of the upper most section, a reference reflector 145 is connected to an end of the fiber. The reference reflector in one aspect includes optical strain sensors. The optical fibers 114 and 116 are wrapped at a wrapping angle such that any strain experienced at the tubular is effectively transferred to the fibers. The smaller the wrapping angle, the more accurate information that may be obtained on the bending and cross-sectional deformations. However, smaller wrapping angles typically require more cable length. A typical wrapping angle is between 20° and 60° and allows for monitoring of strains in both axial and radial directions.

Each fiber optic cable 114 and 116 has a plurality of optical sensors, such as gratings or Fiber Bragg Gratings (FBGs) 125, along their lengths for detecting strains at a plurality of locations of tubulars 114 and 116. The FBGs are spatially distributed along the optical fibers 114 and 116 at a typical separation distance of a few centimeters. Typically, each sensor or FBG is assigned a number (grating number) indicating its position along the optical fiber.

A Fiber Bragg Grating typically operates by reflection of a selected wavelength of light. A Fiber Bragg Grating is typically a section of an optical fiber in which the refractive index has been altered into a plurality of regions of higher and lower refractive index which alternate periodically. The periodic distance between the regions of higher refractive index is generally on the order of wavelengths of light and is known as the grating period, D. Typically, light enters the FBG from one end of the fiber and a selected wavelength of light is reflected backwards at the FBG at a wavelength of the reflected light is related to the grating period D by the following:

$$\lambda_B = 2nD \quad \text{Eq. (1)}$$

where $\lambda_B$ is the wavelength of the reflected light as is known as the Bragg wavelength, n is the refractive index of the optical fiber, and D is the grating period. The FBG is transparent at other wavelengths of light, for all intents and purposes.

As seen with respect to Eq. (1), when D increases, the Bragg wavelength increases. Similarly when D decreases, the Bragg wavelength decreases. Typically, D increases or decrease due to a strain on the FBG. Because of this, an FBG is often attached to an object so that the strains on the object transfers to the FBG to affect the grating period D to thereby produce a wavelength shift that is indicative of the strain. The wavelength shift is then measured. In addition to measuring strain, the grating spacing D in a FBG is affected by thermal effects and changes in temperature which cause expansion or contraction of the FBG. In one aspect, this thermal sensitivity is used for calibration purposes in locating a particular FBG in the fiber optic cable.

Referring again to FIG. 1, an interrogation unit 108 measures wavelength shifts from the plurality of gratings 125. Measurements may be obtained simultaneously using, for example, frequency divisional multiplexing. Interrogation unit 108 is coupled to a surface control unit 130 and in one aspect transmits the measured wavelength shifts to the surface control unit 130. In one aspect, the surface control unit 130 receives the measured wavelength shifts from the interrogation unit 108 and determines from the measured wavelength shifts a deformation on the tubular. A typical surface control unit 130 includes a computer or processor 133, at least one memory 135 for storing programs and data, and a recording medium 137 for recording and storing data and results such as a determined deformation obtained using the exemplary methods disclosed herein. The surface control unit 130 may output the result to various devices, such as display 132 or to the suitable recording medium 137. A brief discussion of an exemplary method for determining deformations on the exemplary tubular 102 of FIG. 1 is presented below.

A tubular undergoing a general deformation experiences one or more deformation modes. Each deformation mode, in turn, has an associated spatial frequency related to the strains obtained at the plurality of FBGs 125 and which may be seen by creating plotting the wavelength shifts $\Delta\lambda$ obtained at the plurality of FBGs against the grating numbers of the FBGs to obtain a dataset of the deformation. In an exemplary embodiment, deformation mode of a tubular may be a fundamental deformation mode such as compression/extension, bending, ovalization, triangularization, and rectangularization. The methods disclosed herein are not limited to these particular modes of deformation and may be applied to higher-order modes of deformation.

The compression/extension deformation mode occurs when a tubular experiences a compressive or tensile force applied in the axial direction. Such a force affects both the tubular axis and the circumference of the tubular. For example, as the tubular is shortened along the axial direction under a compressive force, the circumference expands outward to accommodate. As the tubular is lengthened along the axial direction under a tensile force, the circumference constricts inward to accommodate. Since strain is equal along the tubular, the wavelength shift measured at each FBG on the tubular is substantially the same and a substantially horizontal line is shown on corresponding graphs of $\Delta\lambda$ vs. grating number.

The bending mode of deformation occurs when an external force is applied perpendicular to the axial direction of a tubular. The tubular is compressed at the side of application of the applied force and is in tension along the side away from the applied force. Therefore, FBGs along the compressed side experience a negative wavelength shift $\Delta\lambda$ and FBGs near side in tension experience a positive $\Delta\lambda$. When $\Delta\lambda$ is plotted against grating number, the wavelength shift from the bending mode forms a sinusoidal wave having a given (spatial) wavelength that is the length of a wrap of the fiber around the tubular. The spatial frequency of the bending mode is referred to herein as the characteristic frequency of the system.

The other exemplary deformation modes (i.e., ovalization, rectangularization and triangularization), often referred to as cross-sectional deformations since they lead to changes in the shape of the cross-section, have spatial frequencies in graphs of $\Delta\lambda$ vs. grating number that are related to the characteristic frequency of bending. A typical ovalization deformation mode may occur when two external forces are symmetrically applied perpendicular to the axis of a tubular. In a graph of $\Delta\lambda$ vs. grating number, an ovalization mode forms a sinusoidal wave with a frequency that is double the characteristic frequency of the bending deformation. The triangularization deformation mode occurs when three external forces are applied perpendicular to the axis of a tubular along a threefold symmetry. In a graph of $\Delta\lambda$ vs. grating number, the triangularization mode forms a sinusoidal wave with a frequency that is three times the characteristic frequency of the bending deformation. A rectangularization deformation occurs when four external forces are applied perpendicular to the axis of the tubular in a four-fold symmetry. In a graph of $\Delta\lambda$ vs. grating number, the rectangularization mode forms a sinusoidal wave with a frequency that is four times the characteristic frequency. Although not discussed herein, higher modes of deformation due to symmetrical applied forces having 5-fold symmetry, 6-fold symmetry and onwards may occur and are be addressed using the methods described herein.

In one embodiment, a deformation mode may be obtained from the dataset of wavelength shifts. Methods for determining these deformation modes are summarized below and are also discussed in detail in Ser. Nos. 12/960,140, 12/959,862, and 12/960,119, the contents of which are incorporated herein by reference in their entirety.

Figure 2:
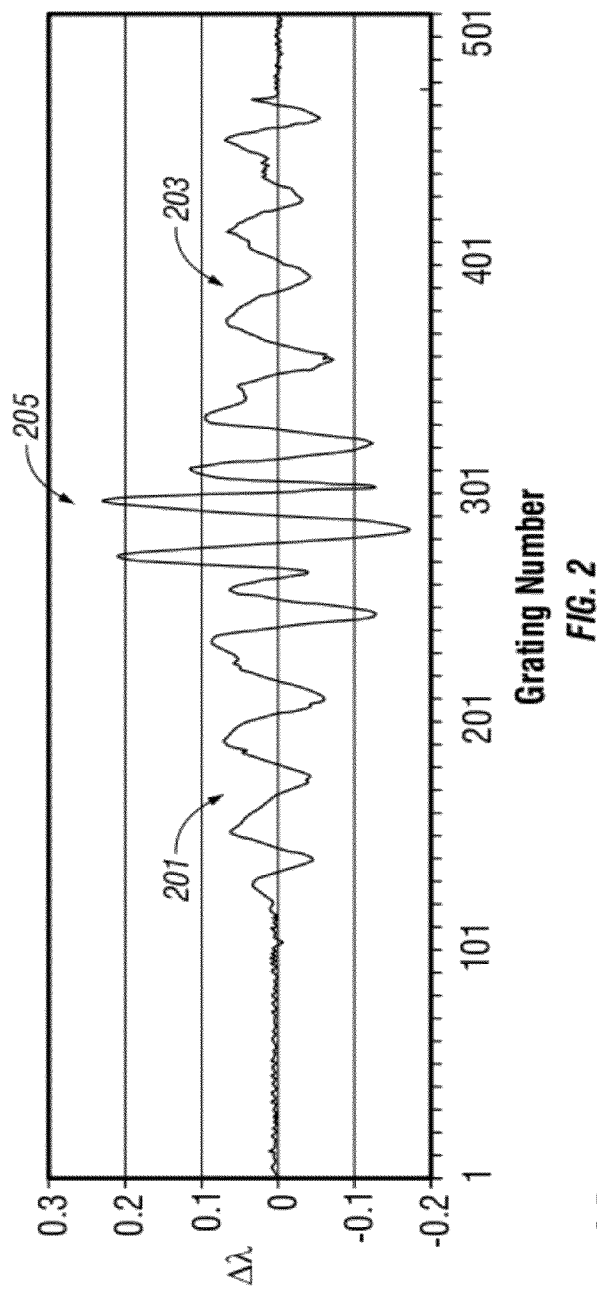
FIG. 2 shows an exemplary set of data obtained from a tubular under an applied force using the system of FIG. 1.

A general deformation of tubular gives rise to a dataset which is displayed as a curve on a graph of wavelength shift against the FBG grating number. An exemplary graph of wavelength shift vs. grating number is shown in FIG. 2. The grating number of each FBG is shown along the abscissa and the change of wavelength $\Delta\lambda$ is plotted along the ordinate. The graph displays some regions 201 and 203 which display primarily a single characteristic frequency, which in this case indicates a dominant bending mode at those FBGs and region 205 in which the frequency is double the characteristic frequency which indicates at least an ovalization mode of deformation in addition to the bending mode.

Figure 3:
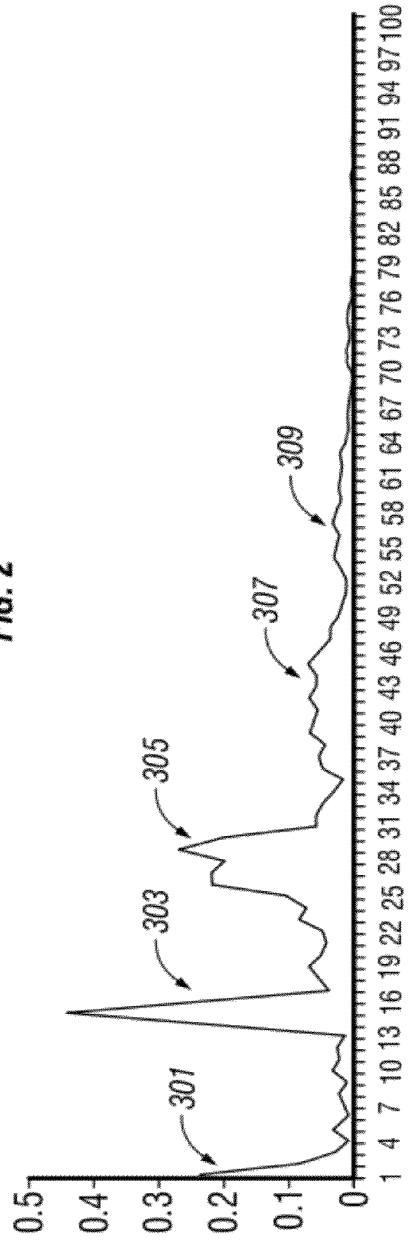
FIG. 3 shows a frequency spectrum of the exemplary dataset of FIG. 2.
Figure 4:
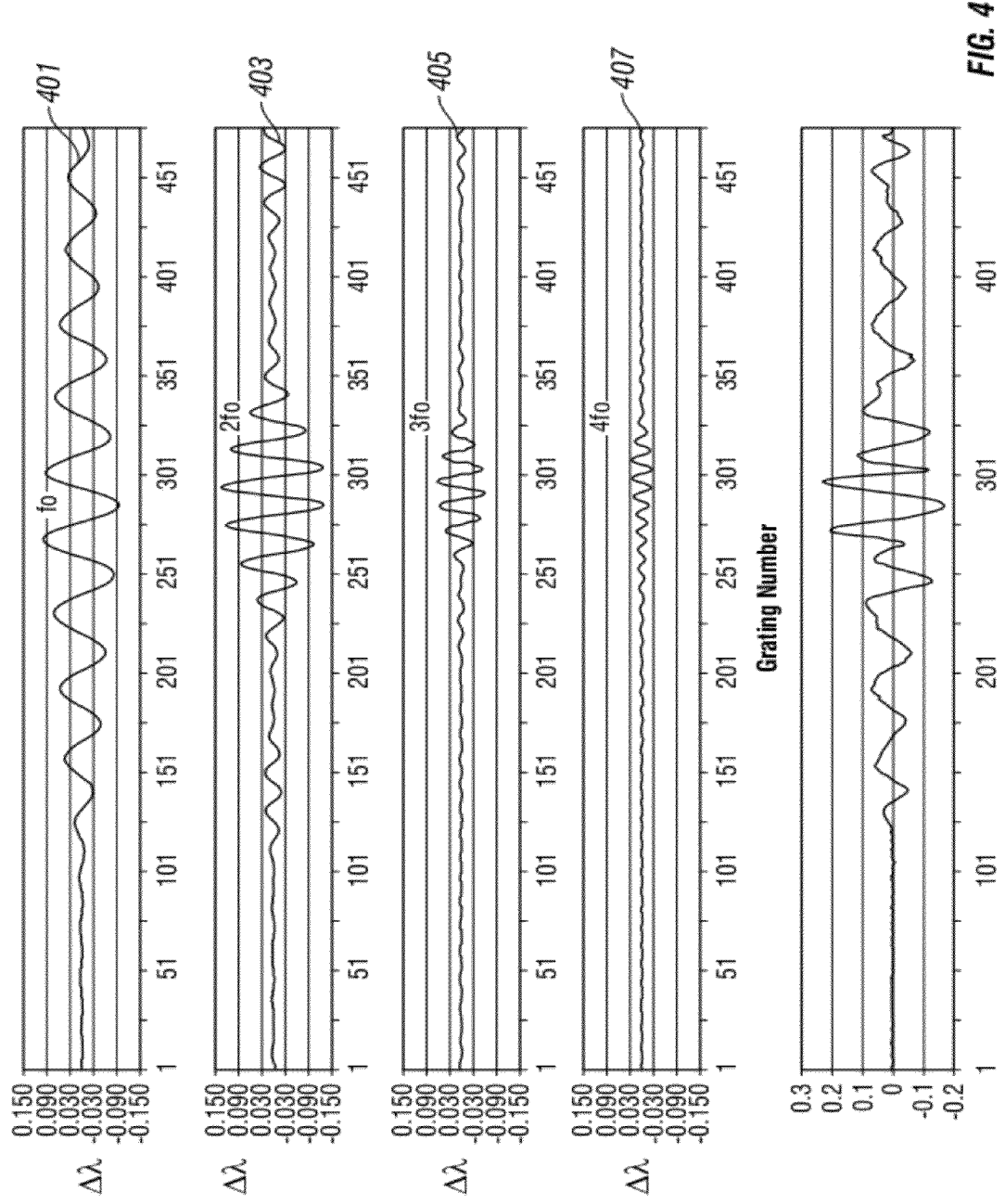
FIG. 4 shows separated strain components in the spatial domain obtained from the exemplary frequency spectrum of FIG. 3.

This exemplary curve may be decomposed into a number of curves corresponding to a deformation mode using spectral decomposition for example. FIG. 3 shows a frequency spectrum of the exemplary dataset of FIG. 2. The exemplary frequency spectrum is obtained using a transform into a frequency space, such as a Discrete Fast Fourier Transform (DFFT), but any suitable method for obtaining a frequency spectrum may be used. The spectrum shows several peaks, each peak corresponding to a separate deformation mode such as compression/tension 301, bending 303, ovalization 305, triangularization 307, and rectangularization 309. These peaks may be separated using for example an adjustable bandpass filter that is adaptable to select a peak of the spectrum. Applying an inverse transform to the separated peaks therefore yields separate graphs of wavelength shift vs. grating number which correspond to each of the deformation modes. Exemplary deformation modes related to FIG. 2 are shown in FIG. 4. Bending 401, ovalization 402, triangularization 405 and rectangularization 407 modes are separately shown.

The exemplary methods for obtaining deformation modes discussed above employ a single fiber optic cable wrapped around a single tubular. However, typically a single fiber optic cable is not used in downhole tubulars, but instead multiple fiber optic cables are spliced together to form a single cable. Although connecting the first and second fiber optic cables produces a single fiber optic cable, there are several differences between two connected cables and a single cable. For instance, splicing fiber optic cables requires that a certain length of fiber optic cable be separated from the tubular to be used as leads for splicing. Gratings on these lead segments therefore provide useless data. In addition, the cable wrapping is typically discontinued in the joining area between two neighboring tubulars, leading to a portion of the tubular in which not data is obtained. Also, there is typically a difference between the azimuthal alignment of tubular sections when they are assembled, which is reflected in an azimuthal phase shift between the gratings of the first tubular section and the section tubular section. Exemplary methods disclosed herein may be used to correct data obtained from two connected fiber optic cables to correspond to data from a single cable referred to herein as a reference cable.

In one aspect, a calibration measurement may be obtained for use in a performing the exemplary corrections described herein. For each tubular section a location of the first grating may be determined at the interrogation unit 108. In an exemplary embodiment, the first grating is determined by heating only the first grating and observing a corresponding wavelength shift at the interrogation unit 108. Since only the first grating receives heat, the wavelength shift occurs at only the first grating. Gratings prior to this point are part of an unattached lead to the fiber optic cable and provide unrelated data. The location of the second grating and higher may be determined from grating spacing and wrapping angle.

The azimuth angle of the leading grating of each tubular is determined relative to a reference mark on the tubular section using a bending calibration experiment. The reference marks are typically dots located on the outer circumferential surface at one or more ends of the tubular section such that a line (reference line) passing through the reference mark(s) is parallel to the tubular axis. During calibration, a bending force is applied to the tubular section at a location circumferentially opposite the reference line. In a bending deformation, the side at which the bending force is applied is compressed and the opposite side is expanded or sent into tension. For a fiber optic grating at the circumference, this appears as a negative wavelength shift along the compressed side and a positive wavelength shift along the expanded side. The greatest compression occurs at the point of application of the bending force, and the greatest expansion occurs at the reference line. Therefore, the one or more gratings having the greatest positive wavelength shift are along the reference line, which is typically assigned an azimuth angle of zero. Consequently, a location of the reference line is determined with respect to the gratings and an azimuth phase angle between the reference line and the first grating is determined.

Upon connecting the first and second tubular sections, typically the reference marks of the connected tubular sections are unaligned. However, the relative azimuth angle between the reference marks may easily be obtained by a measurement such as a visual measurement. Additionally, distance measurements between tubular sections may also be obtained from visual measurements. Once the difference between azimuth angles of the reference marks is known, the difference between the azimuth angles of the leading gratings of any two neighboring sections may be determined.

After calibration, the tubular sections and fiber optic cables are assembled and conveyed downhole, wherein downhole forces are applied which produce strains on the tubular. Wavelength shift data is obtained to determine a reading of these strains. The wavelength shift data typically includes data from the first tubular section and the second tubular section as well as data from cable leads and spliced sections. Although the data from the first tubular section and the second tubular section out of phase with each other, the phase shift determined during calibration may be used to provide a correction.

The exemplary methods discussed below obtain a dataset corresponding to a single ("virtual") cable from a dataset obtained from the segmented fiber optic cable used in downhole environments. A virtual cable is defined such that its length is equivalent to the total length of all the sections and the entire virtual cable is wrapped using the same wrapping angle of the first and second fiber optic cables 114 and 116. Typically, the virtual cable is selected to align with the first fiber optic cable 114 and as a result is generally unaligned with the second fiber optic cable 116 or any subsequent fiber optic cables. However, relative phase shifts between these cables have been obtained in the calibration stage and may therefore be used for corrective purposes.

Once wavelength shift data has been obtained from the multi-sectional tubular deployed downhole, the unrelated data obtained from leading and trailing ends of the fibers and spliced ends may be removed from the data set. The remaining dataset is transformed into a frequency spectrum. A phase shift obtained for the dataset may then be applied to the frequency spectrum to align data from the second fiber optic cable with data from the first fiber optic cable. When the spectrum is transformed into the spatial domain, the obtained spatial dataset substantially corresponds to a dataset from a reference fiber.

Figure 5:
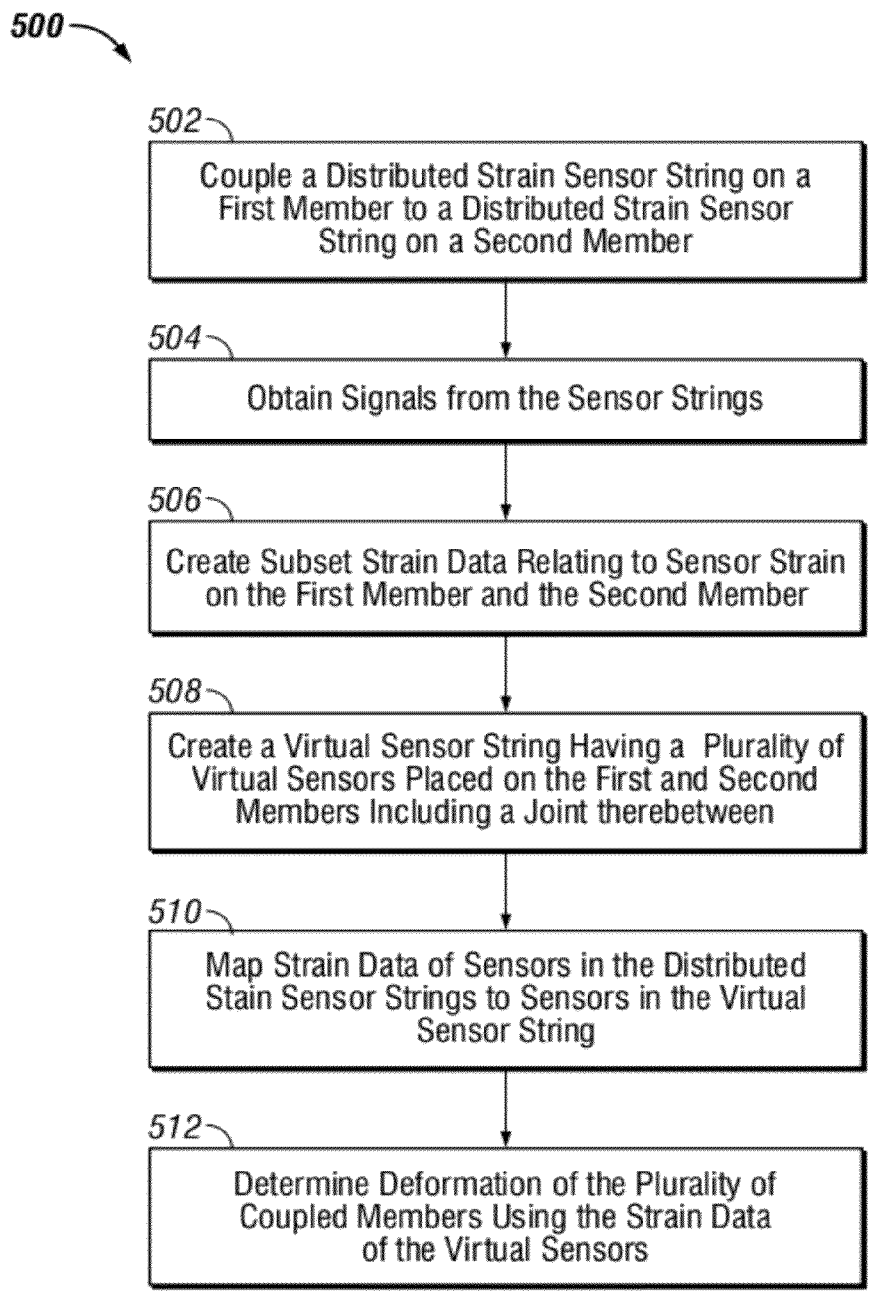
FIG. 5 shows a flowchart of an exemplary method for obtaining data indicative of a tubular wrapped by a single fiber optic cable from a tubular having multiple tubular sections with multiple fiber optic cables connected together.

FIG. 5 shows a flowchart 500 of an exemplary method for obtaining data indicative of a single tubular (e.g., a reference tubular) wrapped by a single fiber optic cable from a tubular having multiple tubular sections with multiple fiber optic cables connected together, such as the tubular of FIG. 1. In Box 502, a distributed strain sensor string on a first member is coupled to a distributed strain sensor string on a second member. In Box 504, signals are obtained from the coupled sensor strings. In Box 506, subset strain data relating to sensor strain on the first member and the second member is created. In Box 508, a virtual sensor string is created, the virtual sensor string having a plurality of virtual sensors placed on the first and second members including a joint therebetween. In Box 510, strain data of sensors in the distributed stain sensor strings is mapped to sensors in the virtual sensor string. In Box 512, deformation of the plurality of coupled members is determined using the strain data of the virtual sensors. The separated deformation modes for the reference cable may then be used in subsequent calculations to, for example, determine deformation modes on the tubular, determine a strain map of the tubular, determine a three-dimensional image of the tubular, and study the dynamics of tubular failure, among others.

Figures 6A, 6B:
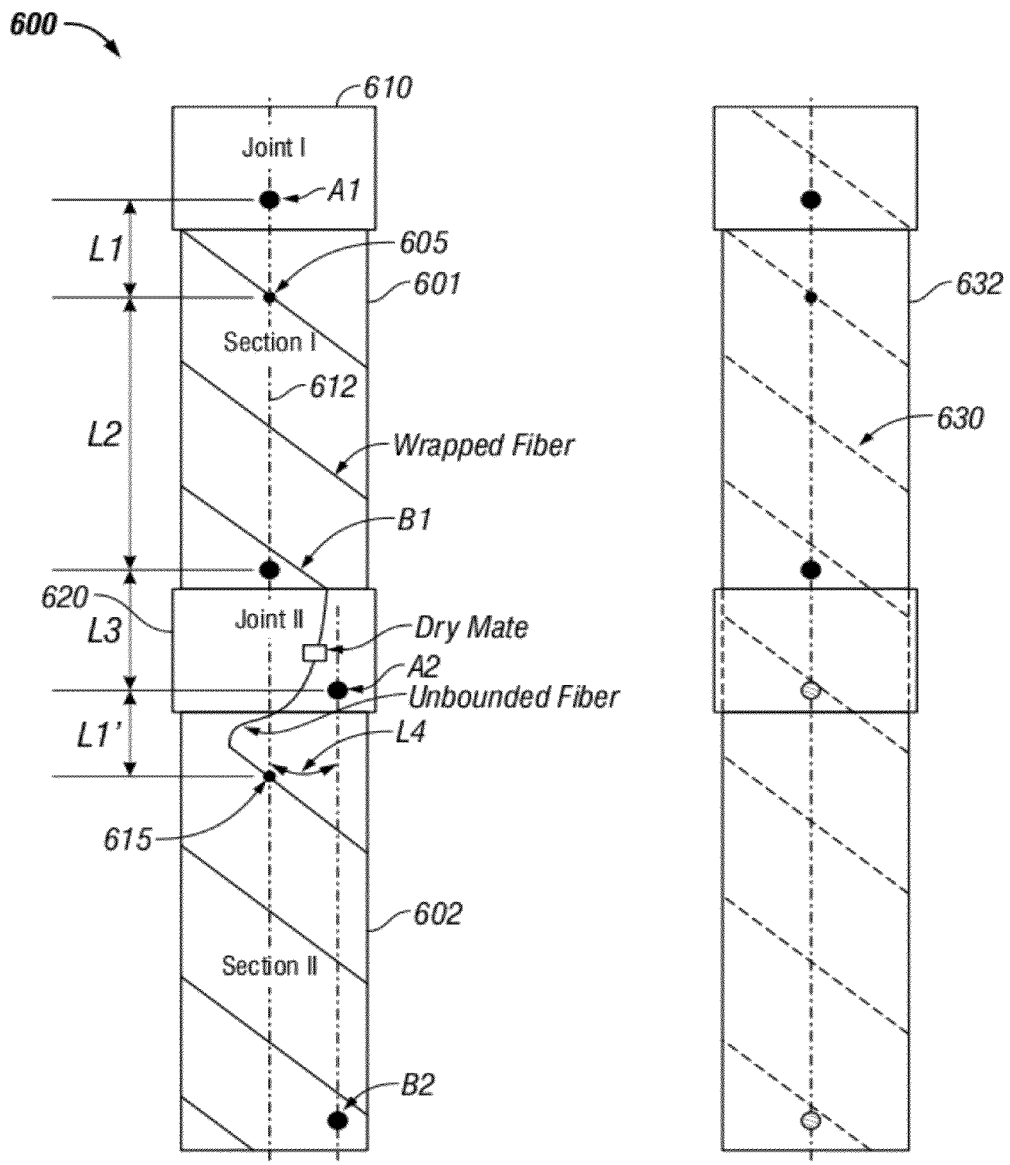
FIG. 6A shows two sections of a tubular that are coupled together by a joint and an attached fiber optic cable.
FIG. 6B shows a continuous fiber (the "virtual" fiber) extending across first and second virtual tubular sections.

A method for preparing a virtual fiber is now discussed. FIG. 6A shows two sections (601, 602) of an exemplary tubular 600 that are coupled together by a joint 620 and an attached fiber optic cable. Typically, joint sections are connected by a collar. A Dry Mate connector may be used to can fiber optic cables of coupled tubular sections. Reference sensors (605, 606) are defined for each tubular section. Once the relative position of each reference sensor (605, 606) of the coupled sections is determined, the relative positions for each sensor can be determined.

Before selecting a reference sensor, a first reference marker A1 is placed on a joint 610 coupled to the tubular section 601 and a second reference marker B1 is placed on a tubular section 601 as shown in FIG. 6A. For convenience, the joint 610 is coupled to one end of the tubular section 601 prior to deployment. The two markers A1 and B1 are aligned along a line 612 parallel to the axis of the tubular. A reference sensor 605 is then selected. The reference sensor is typically selected as the sensor closest to the line 612 nearest the joint 610. Distances L1 (from Marker A1 to the reference sensor 605) and L2 (from the reference sensor 605 to Marker B1) are measured. The second tubular section 602 is similarly assembled with coupled joint 620 and distance L1' between reference marker A2 and reference sensor 615 is determined. A vertical distance L3 between Marker B1 of the first section and Marker A2 of the second section and horizontal surface distance L4 are measured after the second section has been coupled to the first section. The vertical distance between the reference sensor of the first section and the reference sensor in the second section is then calculated as the summation of distances $L_1$, $L_2$ and $L_3$. The azimuth angle between the two reference sensors are calculated from the distance $L_4$ and the outer diameter of the tubular. The position information thus obtained is used in constructing the virtual section and virtual fiber as shown in FIG. 6B.

FIG. 6B shows a continuous fiber (the "virtual" fiber 630) extending across single virtual tubular section 632. A virtual fiber is created to represent strain measurements over a virtual section that comprises the connected sections. As shown in FIG. 6B, a virtual section comprises all sections of a tubular and the associated joints as if they were a single tubular. In an exemplary aspect, the virtual fiber is considered to be an extension of the fiber in the first section, continuing the same wrap mode from the first section to the joint between the two sections and to the second section as well, and onward through the remaining joints and sections. The diameter of the virtual section in the joint is chosen to be the diameter of the coupled sections. Therefore, once data is obtained for the virtual fiber, methods described herein for determine deformation parameters may be applied to the multi-section tubular as if it were a single tubular of equivalent length.

A baseline deflection measurement may be conducted for each tubular. In the deflection measurement, wavelength data are taken from the sensors by applying a bending stress at a midpoint of the tubular and at a location opposite the line 612 connecting Markers A1 and B1. Wavelength shift data obtained during deflection are then obtained by subtracting these data from a data set obtained without stress applied. Analysis and interpretation of this wavelength shift data for each tubular yields useful information on (1) the indexes of the reference sensor and of the first and last bounded sensors; (2) the azimuth angles of the reference sensor and first and last bounded sensors; (3) a matching factor for correcting a mismatch in grating spacing, wrap angle and pipe diameter.

The deflection baseline measurement may be used to determine a location of the reference sensors after deployment. The process of wrapping a fiber to the surface of a tubular normally leaves a "residue stress" in many gratings. Many of these residual stresses are detectable after deployment. Mapping the residual stresses in measurement data to the baselines allows one to locate the position of the reference sensor in the measurement data. An exemplary chart of mapping two deflection baselines to the two section data are displayed in FIG. 7.

Figure 7:
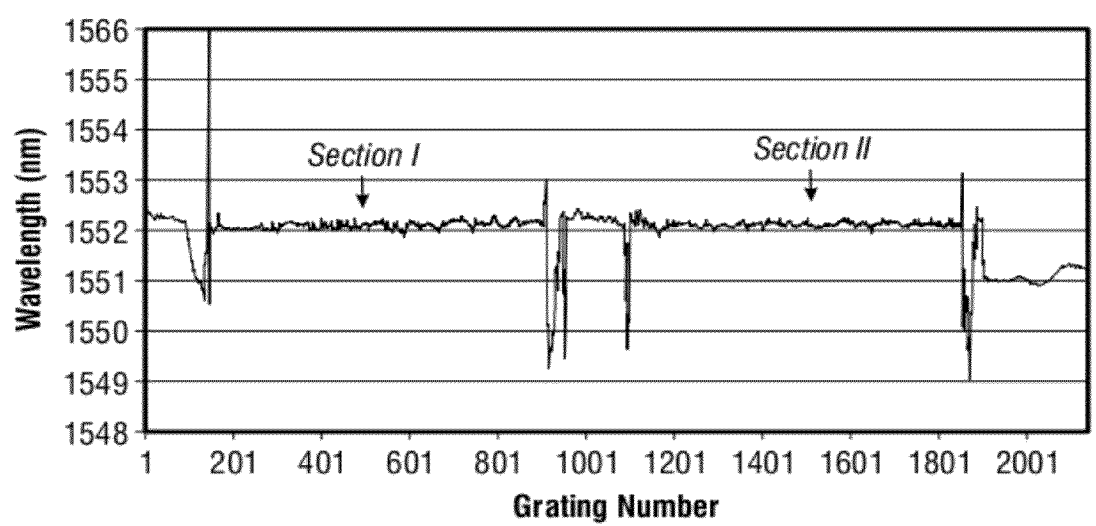
FIG. 7 shows data from sensors on trailing and leading sections of the fiber optic cable, data from each of the tubular sections and data from sensors that cross a joint connecting the tubular sections.

FIG. 7 shows data from sensors on trailing and leading sections of the fiber optic cable, data from each of the tubular sections and data from sensors that cross a joint connecting the tubular sections. A virtual fiber is created from the data of the first and tubular sections. Data corresponding to sensors cross the join are created using methods described herein.

The data set corresponding to a selected tubular section can be determined simply by selecting a block of data mapped to the baseline data set. The azimuth angle ($\phi$) of a reference sensor of a selected section is obtained by adding the azimuth angle measured during deployment ($\phi_0$) to that of the reference sensor in baseline.

$$\phi = \phi_0 + \frac{L_4}{r} \quad (2)$$

wherein L4 is a circumferential difference between reference markers in adjoining sections and r is a radius of the sections. Subsequently, the azimuth angles for all other gratings can be calculated from their index values and the wrap number.

At joint sections, the virtual fiber has no corresponding physical sensors because grating data at the joint are discarded. The physical length of a virtual fiber segment is calculated as $$L = L_1' + L_2 + L_3 - (N_1 + N_2')\Delta \sin\theta \quad (3)$$

where $N_1$ is the number of sensors in the first section excluding all those before its reference sensor, and $N_2'$ the number of sensors in the second section excluding those after its reference sensor. $\Delta$ is the grating spacing and $\theta$ is the wrapping angle. From Eq. (3), the total number of virtual gratings is calculated:

$$N = \frac{L}{\Delta \sin\theta} \quad (4)$$

Figure 8A:
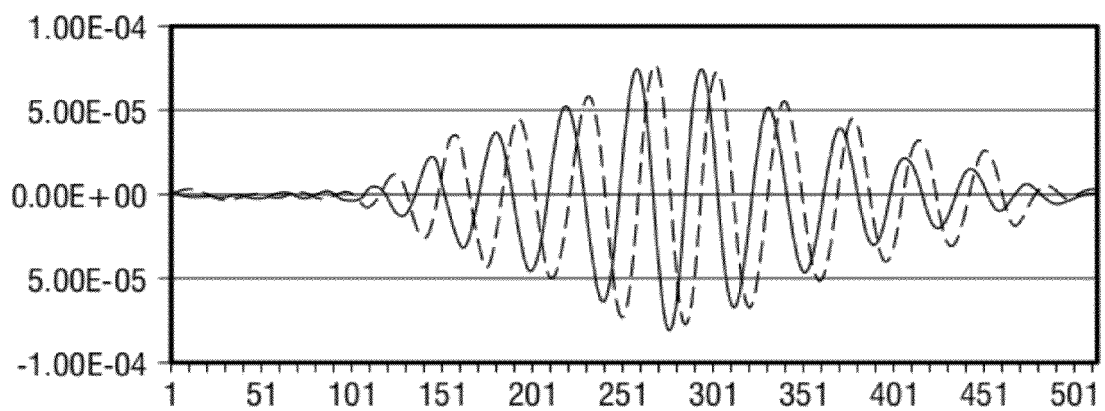
FIG. 8A shows exemplary plots of bending strain data for a fiber optic cable section and for a related virtual fiber section in which phase is rotated by 60 degrees.
Figure 8B:
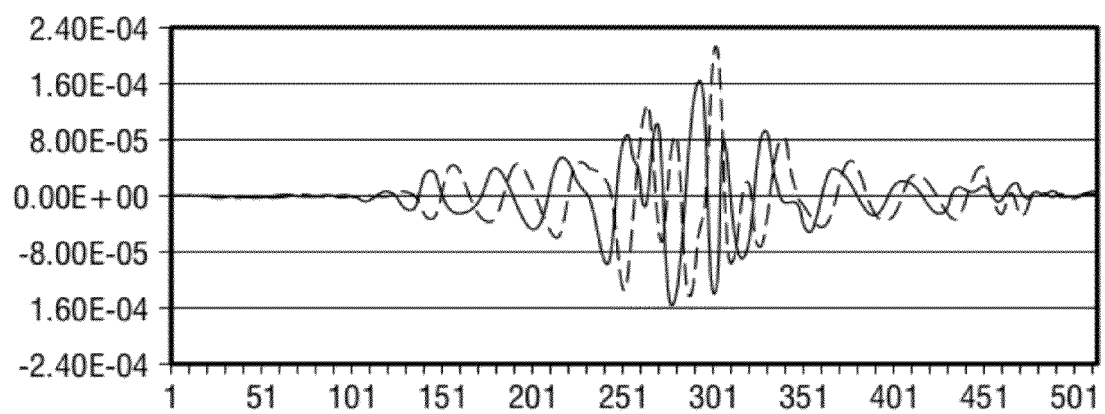
FIG. 8B shows an exemplary strain distribution for a fiber optic cable section and a related virtual fiber section in which phase is rotated by 60 degrees.
Figure 9:
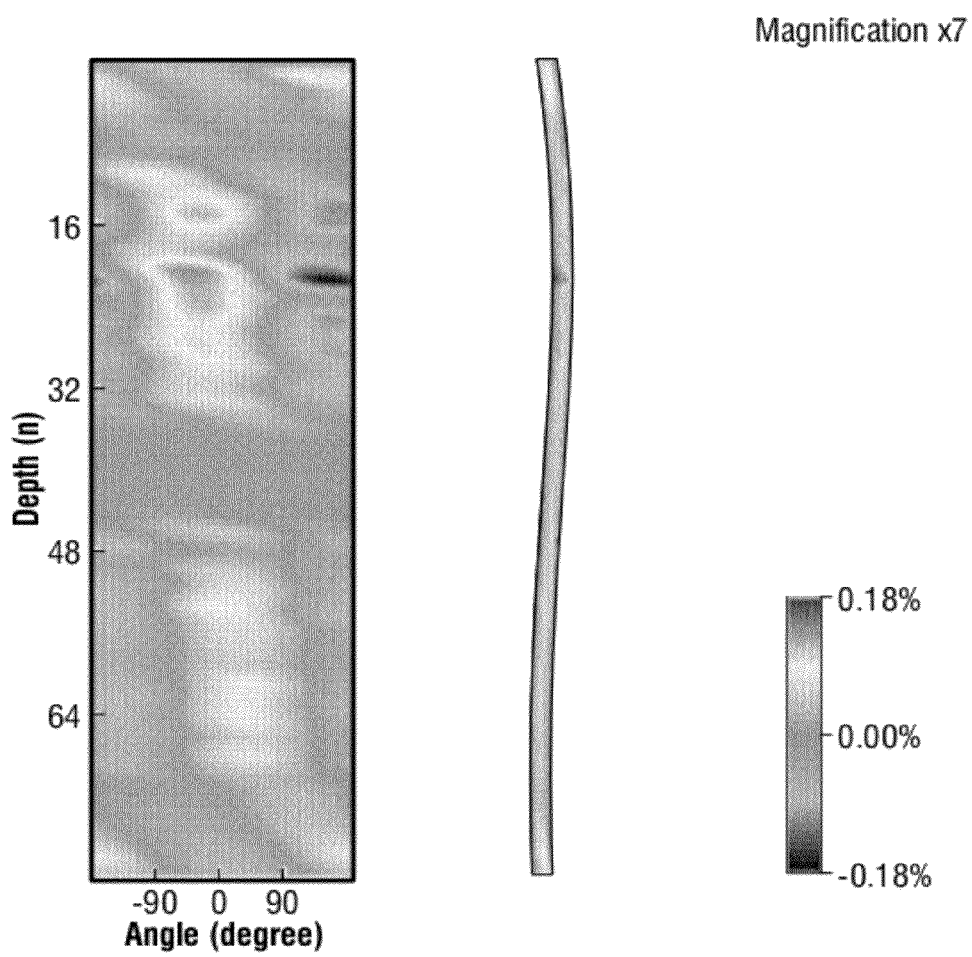
FIG. 9 shows an exemplary 2D strain map and 3D image such obtained for a system of multiple sections.

To create strain data set for the virtual section ***, a data set corresponding to the virtual fiber includes a dataset corresponding to the first tubular section followed by a dataset corresponding to a joint section followed by a dataset for the second tubular section. This can be continued for additional tubular sections and joints. Since the azimuth angles of the virtual sensors in the second section are known, corresponding phase shifts in the second tubular section can be determined. A phase shift is a difference in the azimuth angles between sensors from the virtual fiber and related sensors from the physical fiber. This phase shift is used to map the data from the physical fiber to the virtual fiber using the properties of the strain distribution for individual deformation modes. The surface strain components for each deformation mode can be written as $$\epsilon_n = f_n(z)\cos(n\phi) \quad (5)$$

where $f_n(z)$ describes the strain distribution along the z-axis in a cylindrical coordinate system, and n=0, 1, 2, 3, 4 respectively for the five exemplary deformation modes disclosed herein. To map each strain component, one applies the calculated phase shift to each frequency component in the spatial frequency domain spectrum. The phase shift is applied separately for each deformation mode. FIG. 8A shows the exemplary plots of bending strain data against grating number, for a fiber optical cable section and for a related virtual fiber section in which phase is rotated by 60 degrees. An overall strain distribution with a similar 60 degree phase shift is plotted in FIG. 8B. The data after applying a phase shift are assigned to corresponding virtual sensors. An exemplary 2D strain map and 3D image such obtained for a system of multiple sections are shown in FIG. 9.

Therefore, in one aspect, the present disclosure provides a method for determining deformation of a plurality of coupled members, the method including: coupling a distributed strain sensor string on a first member to a distributed strain sensor string on a second member; obtaining signals from the sensor strings; creating subset strain data relating to sensor strain on the first member and the second member; creating a virtual sensor string having a plurality of virtual sensors placed on the first and second members including a joint therebetween; mapping strain data of sensors in the distributed stain sensor strings to sensors in the virtual sensor string; and determining deformation of the plurality of coupled members using the strain data of the virtual sensors. A member of the plurality of couple members may be one of: (1) a casing; (2) a sand screen; (3) a subsea riser; (4) an umbilical; (5) a member of production tubing; (6) a pipeline; (7) a cylindrical structure bearing a load. The strain sensors can be least one of: (1) distributed Bragg grating sensors; (2) distributed Brillouin fiber optic sensors; (3) electrical distributed strains sensors; and (4) fiber optical distributed strain sensors. The strains may be measured in one of: (1) wavelength shift; (2) frequency change; (3) change in impedance; and (4) any physical means for measuring strain. Coupling the first member and the second member further comprises determining a relation between a reference sensor of the first member to a reference sensor of the second member and/or determining a relative azimuth angle between the first member and the second member. Obtaining signals may includes mapping each sensor to a baseline, which may further include providing signature information. Mapping each sensor to the baseline may also include determining an azimuth angle of a reference sensor. Subset strain data may be created by selecting data from the obtained dataset that is related to the first and second members as well as obtaining an azimuth angle of a reference sensor. The azimuth angle of the reference sensor may be obtained by applying a bending force to a member. The virtual sensor string may be made to pass through the joint. Creating virtual sensor string may include determining a phase difference between the distributed sensor string and the virtual sensor string. Mapping strain data to the corresponding virtual sensor string may include applying a phase shift to a spectrum in a spatial frequency domain transformed from the distributed strain data.

In another embodiment, the present disclosure provides an apparatus for determining deformation for a plurality of coupled members, the apparatus including a first distributed strain sensor string on a first of the plurality of coupled members; a second distributed strain sensor string on a second of the plurality of coupled members and coupled to the first distributed strain sensor string; an interrogation unit configured to obtain signals from the first and second strain sensor strings; and a processor configured to: create subset strain data relating to sensor strain on the first member and the second member, create a virtual sensor string having a plurality of virtual sensors placed on the first and second members including a joint therebetween, map strain data of sensors in the distributed stain sensor strings to sensors in the virtual sensor string, and determine deformation of the plurality of coupled members using the strain data of the virtual sensors. A member of the plurality of coupled members may be one of: (1) a casing; (2) a sand screen; (3) a subsea riser; (4) an umbilical; (5) a member of production tubing; (6) a pipeline; (7) a cylindrical structure bearing a load. The strain sensors may be at least one of: (1) distributed Bragg grating sensors; (2) distributed Brillouin fiber optic sensors; (3) electrical distributed strains sensors; and (4) fiber optical distributed strain sensors. Distributed strains from the distributed strain sensors may be measured in one of: (1) wavelength shift; (2) frequency change; (3) change in impedance; and (4) any physical means for measuring strain. The processor is further configured to use a relation of a relative azimuth angle between a reference sensor of the first member to a reference sensor of the second member. The processor maps obtained of each sensor to a baseline in one aspect to provide signature information. The processor may map each sensor to the baseline by determining an azimuth angle of a reference sensor. The processor may be used to create subset strain data by selecting data from the obtained dataset that is related to the first and second members and/or to create subset strain data by obtaining an azimuth angle of a reference sensor. The processor may create the virtual sensor string through the joint and determine a phase difference between the distributed sensor strain string and the virtual sensor string. The processor may map strain data to the corresponding virtual sensor string by applying a phase shift to a spectrum in a spatial frequency domain transformed from the distributed strain data. The processor may also determine a location of a reference sensor by observing a strain signal at the reference sensor when the reference sensor is selectively heated. In one embodiment, the azimuth angle of the reference sensor is obtained by applying a bending force to a member.

In another aspect, the present disclosure provides a computer readable medium having stored thereon instructions that when read by a processor enable the processor to perform a method, the method comprising: coupling a distributed strain sensor string on a first member to a distributed strain sensor string on a second member; obtaining signals from the sensor strings; creating subset strain data relating to sensor strain on the first member and the second member; creating a virtual sensor string having a plurality of virtual sensors placed on the first and second members including a joint therebetween; mapping strain data of sensors in the distributed stain sensor strings to sensors in the virtual sensor string; and determining deformation of the plurality of coupled members using the strain data of the virtual sensors.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of determining a deformation mode of coupled first member and second member, comprising:
    coupling a first distributed strain sensor string on the first member to a second distributed strain sensor string on the second member;
    propagating light through the first distributed strain sensor string and the second distributed strain sensor string to obtain strain data from sensors in the first distributed strain sensor string and sensors in the second distributed strain sensor string;
    creating subset strain data from the obtained strain data;
    creating a virtual sensor string on the first and second members including a joint therebetween, the virtual sensor string including a plurality of virtual sensors; continuing a wrap mode from the first distributed strain sensor string to the virtual sensor string;
    determining a phase shift between an azimuthal angle of the subset strain data and an azimuthal angle of the virtual sensor string;
    using the subset strain data and the phase shift to determine virtual strain data at the plurality of virtual sensors in the virtual sensor string; and
    determining the deformation mode of the coupled first member and second member using the virtual strain data.

2. The method of claim 1, wherein at least one of the first member and the second member is selected from the group consisting of: (1) a casing; (2) a sand screen; (3) a subsea riser; (4) an umbilical; (5) a member of production tubing; (6) a pipeline; (7) a cylindrical structure bearing a load.

3. The method of claim 1, wherein the sensors are at least one of: (1) distributed Bragg grating sensors; (2) distributed Brillouin fiber optic sensors; (3) electrical distributed strains sensors; and (4) fiber optical distributed strain sensors.

4. The method of claim 1, wherein the strains from the strain sensors are measured in one of: (1) wavelength shift; (2) frequency change; (3) change in impedance; and (4) any physical means for measuring strain.

5. The method of claim 1, wherein coupling the first member and the second member further comprises determining a relation between a reference sensor of the first member to a reference sensor of the second member.

6. The method of claim 5, wherein coupling the first member and the second member further comprises determining a relative azimuth angle between the first member and the second member.

7. The method of claim 1, wherein obtaining the strain data further comprises mapping each sensor to a baseline.

8. The method of claim 7, wherein mapping each sensor to the baseline further comprises providing signature information.

9. The method of claim 7, wherein mapping each sensor to the baseline further comprises determining an azimuth angle of a reference sensor.

10. The method of claim 1, wherein creating the subset strain data further comprises selecting strain data from at least one of the first member and the second member.

11. The method of claim 1, wherein creating the subset strain data further comprises obtaining an azimuth angle of a reference sensor.

12. The method of claim 11, wherein obtaining the azimuth angle of the reference sensor further comprises applying a bending force to a member.

13. The method of claim 1, further comprising creating the virtual sensor string to extend through the joint.

14. The method of claim 1, wherein mapping the subset strain data to the virtual sensors of the virtual sensor string further comprises mapping the subset strain data through a difference in azimuth between the subset strain data and the virtual sensor string.

15. The method of claim 1, wherein mapping the subset strain data to the virtual sensor string further comprises applying an azimuthal phase shift to a spectrum in a spatial frequency domain transformed from the distributed strain data.

16. An apparatus for determining a deformation mode for a plurality of coupled members, comprising:
    a first distributed strain sensor string on a first member of the plurality of coupled members;
    a second distributed strain sensor string on a second member of the plurality of coupled members and coupled to the first distributed strain sensor string;

an interrogation unit configured to propagate light through the first distributed strain sensor string and the second distributed strain sensor string to obtain strain data from the first distributed strain sensor string and the second distributed strain sensor string; and a processor configured to:

create subset strain data from the obtained strain data;

create a virtual sensor string having a plurality of virtual sensors placed on the first member and the second member including a joint therebetween, wherein a wrap mode continues from the first distributed strain sensor string to the virtual sensor string;

determining a phase shift between an azimuthal angle of the subset data and an azimuthal angle of the virtual sensor string;

using subset strain data and the phase shift to determine virtual strain data at the plurality of virtual sensors in the virtual sensor string; and determine a deformation mode of the plurality of coupled members using the virtual strain data.

17. The apparatus of claim 16, wherein at least one of the first member and the second member is selected from the group consisting of: (1) a casing; (2) a sand screen; (3) a subsea riser; (4) an umbilical; (5) a member of production tubing; (6) a pipeline; (7) a cylindrical structure bearing a load.

18. The apparatus of claim 16, wherein the sensors are at least one of: (1) distributed Bragg grating sensors; (2) distributed Brillouin fiber optic sensors; (3) electrical distributed strains sensors; and (4) fiber optical distributed strain sensors.

19. The apparatus of claim 16, wherein the strains from the distributed strain sensors are measured in one of: (1) wavelength shift; (2) frequency change; (3) change in impedance; and (4) any physical means for measuring strain.

20. The apparatus of claim 16, wherein the processor is further configured to determine a relation between a reference sensor of the first member to a reference sensor of the second member.

21. The apparatus of claim 20, wherein the relation between the reference sensor of the first member and the reference sensor of the second member further comprises a relative azimuth angle.

22. The apparatus of claim 16, wherein the processor is further configured to map each sensor to a baseline.

23. The apparatus of claim 22, wherein the processor is further configured to map each sensor to the baseline to provide signature information.

24. The apparatus of claim 22, wherein the processor is further configured to map each sensor to the baseline by determining an azimuth angle of a reference sensor.

25. The apparatus of claim 16, wherein the processor is further configured to create the subset strain data from strain data from at least one of the first member and the second member.

26. The apparatus of claim 16, wherein the processor is further configured to create the subset strain data by obtaining an azimuth angle of a reference sensor.

27. The apparatus of claim 26, wherein the azimuth angle of the reference sensor is obtained by applying a bending force to a member.

28. The apparatus of claim 16, wherein the processor is configured to create the virtual sensor string to extend through the joint.

29. The apparatus of claim 16, wherein the processor is further configured to determine a difference in azimuth between the subset strain data and the virtual sensor string and map the subset strain data to the virtual sensors of the virtual sensor string using the determined difference in azimuth.

30. The apparatus of claim 16, wherein the processor is further configured to map the subset strain data to the virtual sensor string by applying an azimuthal phase shift to a spectrum in a spatial frequency domain transformed from the distributed strain data.

31. The apparatus of claim 16 wherein the processor is further configured to determine a location of a reference sensor by observing a strain signal at the reference sensor.

32. A non-transitory computer readable medium having computer instructions stored therein for causing a computer processor to perform a method for determining a deformation mode of a coupled first member and second member, wherein a first distributed strain sensor string on the first member is coupled to a second distributed strain sensors string on the second member, the method comprising:

propagating light through the first distributed strain sensor string and the second distributed strain sensor string to obtain strain data from the sensors in the first distributed strain sensor string and the second distributed strain sensors string;

creating subset strain data from the obtained data;

creating a virtual sensor string on the first member and the second member including a joint therebetween, the virtual sensor string including a plurality of virtual sensors;

continuing a wrap mode from the first distributed strain sensor string to the virtual sensor string;

determining a phase shift between an azimuthal angle of the subset data and an azimuthal angle of the virtual sensor string;

using the subset strain data and the phase shift to determine virtual strain data at the plurality of virtual sensors in the virtual sensor string; and determining a deformation mode of the coupled first member and second member using the virtual strain data.

* * * * *